(12) United States Patent
Bush et al.

(10) Patent No.: US 10,722,414 B2
(45) Date of Patent: Jul. 28, 2020

(54) EXERCISING DEVICE (71) Applicants: Alex Bush, Cypress, TX (US); Shirley Martinez, Cypress, TX (US)

(72) Inventors: Alex Bush, Cypress, TX (US); Shirley Martinez, Cypress, TX (US)

( * ) Notice: Subject to any disclaimer, the term of this patent is extended or adjusted under 35 U.S.C. 154(b) by 408 days.

(21) Appl. No.: 15/800,808

(22) Filed: Nov. 1, 2017

(65) Prior Publication Data
US 2019/0125608 A1 May 2, 2019

(51) Int. Cl.
| | |
|---|---|
| *A61H 1/02* | (2006.01) |
| *A61H 1/00* | (2006.01) |
| *A63B 23/04* | (2006.01) |
| *H02S 40/38* | (2014.01) |

(52) U.S. Cl.
CPC ............ *A61H 1/0214* (2013.01); *A61H 1/00* (2013.01); *A61H 1/0237* (2013.01); *A61H 1/0255* (2013.01); *A61H 1/0274* (2013.01); *A61H 1/0277* (2013.01); *A61H 1/0281* (2013.01); *A61H 2201/1215* (2013.01); *A61H 2201/164* (2013.01); *A61H 2201/1635* (2013.01); *A61H 2201/1642* (2013.01); *A61H 2201/1671* (2013.01); *A61H 2201/5007* (2013.01); *A61H 2201/5043* (2013.01); *A61H 2201/5046* (2013.01); *A61H 2205/06* (2013.01); *A61H 2205/062* (2013.01); *A61H 2205/10* (2013.01); *A61H 2205/102* (2013.01); *A61H 2205/108* (2013.01); *A63B 23/04* (2013.01); *H02S 40/38* (2014.12)

(58) Field of Classification Search
CPC ...... A61H 1/0214; A61H 1/00; A61H 1/0274; A61H 1/0237; A61H 1/0281; A61H 1/0277; A61H 1/0255; A61H 2201/5046; A61H 2205/10; A61H 2201/5043; A61H 2205/06; A61H 2201/5007; A61H 2201/1671; A61H 2201/164; A61H 2205/062; A61H 2205/108; A61H 2205/102; A61H 2201/1215; A61H 2201/1635; A61H 2201/1642; A63B 21/0427; A63B 21/4033–4037; A63B 22/06–0605; A63B 2022/0611–0658; A63B 2022/067–0688; H02S 40/38
USPC ...................................................... 482/57, 63
See application file for complete search history.

(56) References Cited

U.S. PATENT DOCUMENTS

| | | | | |
|---|---|---|---|---|
| 3,100,640 | A | * | 8/1963 | Weitzel ............. A63B 22/0007 482/60 |
| 3,735,979 | A | * | 5/1973 | Levenberg ............... A63B 9/00 482/143 |

(Continued)

*Primary Examiner* — Andrew S Lo (57) ABSTRACT

An exercising device for therapeutic rehabilitation includes a housing that defines an interior space. At least one battery and a motor is coupled to the housing and are positioned in the interior space. The motor is operationally coupled to the at least one battery. Each of a pair of shafts is operationally coupled to the motor and extends through a respective opposing side of the housing. Each of a pair of pedals is selectively couplable to an associated shaft. Each pedal is configured to selectively position an associated foot and an associated hand of the user. The motor is configured to rotate the shafts to compel an associated limb of the user to rotate concurrent with the associated shaft to exercise a user.

16 Claims, 6 Drawing Sheets

(56) References Cited

U.S. PATENT DOCUMENTS

| | | | | |
|---|---|---|---|---|
| 3,960,144 A * | 6/1976 | Simjian | | A61H 11/00 |
| | | | | 601/132 |
| 4,390,177 A * | 6/1983 | Biran | | A63B 21/1609 |
| | | | | 188/83 |
| 4,601,464 A | 7/1986 | Mousel | | |
| 4,632,386 A * | 12/1986 | Beech | | A63B 22/0605 |
| | | | | 482/57 |
| 4,757,988 A * | 7/1988 | Szymski | | A63B 22/0605 |
| | | | | 482/59 |
| 4,822,032 A * | 4/1989 | Whitmore | | A63B 21/15 |
| | | | | 482/6 |
| 5,108,092 A | 4/1992 | Hurst | | |
| 5,314,392 A * | 5/1994 | Hawkins | | A63B 22/0056 |
| | | | | 482/52 |
| 5,316,101 A * | 5/1994 | Gannon | | B60L 8/003 |
| | | | | 180/221 |
| 5,472,396 A * | 12/1995 | Brazaitis | | A63B 22/0605 |
| | | | | 482/57 |
| 5,490,824 A * | 2/1996 | Wang | | A63B 22/0007 |
| | | | | 482/119 |
| 5,573,481 A * | 11/1996 | Piercy | | A63B 22/0605 |
| | | | | 482/57 |
| 5,860,329 A * | 1/1999 | Day | | B62M 1/24 |
| | | | | 74/143 |
| 5,860,941 A * | 1/1999 | Saringer | | A61H 1/0214 |
| | | | | 482/4 |
| 5,928,114 A * | 7/1999 | Chen | | A63B 22/001 |
| | | | | 482/51 |
| 5,984,335 A * | 11/1999 | Tseng | | B62M 6/55 |
| | | | | 180/206.4 |
| 6,669,604 B1 * | 12/2003 | Lee | | B62M 23/00 |
| | | | | 482/57 |
| 6,730,003 B1 * | 5/2004 | Phillips | | A63B 22/0046 |
| | | | | 482/57 |
| 6,840,892 B1 * | 1/2005 | Wu | | A63B 21/00181 |
| | | | | 482/51 |
| 7,160,231 B2 | 1/2007 | Kazemi | | |
| 7,662,070 B1 * | 2/2010 | Mann | | A61H 1/0214 |
| | | | | 482/51 |
| 7,727,125 B2 | 6/2010 | Day | | A63B 21/015 |
| | | | | 482/5 |
| D637,664 S | 5/2011 | Battison | | |
| 9,199,114 B1 * | 12/2015 | Santoro | | A63B 21/015 |
| 9,474,930 B2 * | 10/2016 | Hsu | | A63B 23/0476 |
| 9,757,611 B1 * | 9/2017 | Colburn | | A63B 22/0605 |
| 9,925,403 B1 * | 3/2018 | Zarli | | A63B 1/00 |
| 10,092,791 B2 * | 10/2018 | Donnelly | | A63B 21/0726 |
| 10,434,364 B2 * | 10/2019 | Cristofori | | A63B 22/0605 |
| 10,507,355 B2 * | 12/2019 | Vassilaros | | A63B 21/4034 |
| 10,512,818 B2 * | 12/2019 | Powell | | A63B 71/0036 |
| 2003/0036462 A1 * | 2/2003 | Ravikumar | | A61H 1/0266 |
| | | | | 482/51 |
| 2003/0050152 A1 * | 3/2003 | Sze | | A61H 1/0214 |
| | | | | 482/57 |
| 2004/0009848 A1 * | 1/2004 | Lee | | A63B 22/0605 |
| | | | | 482/57 |
| 2004/0106502 A1 * | 6/2004 | Sher | | A63B 21/00178 |
| | | | | 482/8 |
| 2004/0121885 A1 * | 6/2004 | Garcia-Rill | | A61H 1/0214 |
| | | | | 482/60 |
| 2005/0107221 A1 * | 5/2005 | Vohryzka | | A63B 22/0007 |
| | | | | 482/57 |
| 2006/0003872 A1 * | 1/2006 | Chiles | | A63B 21/225 |
| | | | | 482/57 |
| 2006/0019802 A1 * | 1/2006 | Caird | | A63B 22/0605 |
| | | | | 482/57 |
| 2006/0035760 A1 * | 2/2006 | Hill | | A61H 1/0214 |
| | | | | 482/57 |
| 2007/0184937 A1 * | 8/2007 | Graber | | A63B 21/015 |
| | | | | 482/52 |
| 2008/0085819 A1 * | 4/2008 | Yang | | A63B 21/015 |
| | | | | 482/62 |
| 2008/0280735 A1 * | 11/2008 | Dickie | | A63B 22/001 |
| | | | | 482/62 |
| 2008/0300113 A1 | 12/2008 | Battison | | |
| 2009/0036274 A1 * | 2/2009 | Greene | | A63B 22/203 |
| | | | | 482/57 |
| 2009/0111658 A1 * | 4/2009 | Juan | | A63B 21/0058 |
| | | | | 482/5 |
| 2010/0113223 A1 * | 5/2010 | Chiles | | A63B 21/225 |
| | | | | 482/5 |
| 2011/0195819 A1 * | 8/2011 | Shaw | | A63B 24/0062 |
| | | | | 482/5 |
| 2014/0187383 A1 * | 7/2014 | Martin | | A47B 83/04 |
| | | | | 482/8 |
| 2016/0016636 A1 * | 1/2016 | Thompson | | A63B 24/0062 |
| | | | | 74/594.7 |
| 2016/0082311 A1 * | 3/2016 | Massaro | | A63B 22/0005 |
| | | | | 482/63 |
| 2016/0136483 A1 * | 5/2016 | Reich | | A63B 24/0062 |
| | | | | 482/2 |
| 2018/0104564 A1 * | 4/2018 | Cardon | | A63B 71/0622 |
| 2018/0228682 A1 * | 8/2018 | Bayerlein | | A61H 1/0214 |
| 2018/0353804 A1 * | 12/2018 | Pei | | A63B 1/00 |
| 2018/0370594 A1 * | 12/2018 | Foley | | B62M 6/90 |
| 2019/0056777 A1 * | 2/2019 | Munoz | | G06F 1/3293 |
| 2019/0168069 A1 * | 6/2019 | Chizhov | | A61G 5/128 |
| 2019/0240528 A1 * | 8/2019 | Donnelly | | B65D 21/0204 |

\* cited by examiner

EXERCISING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to exercising devices and more particularly pertains to a new exercising device for therapeutic rehabilitation.

BRIEF SUMMARY OF THE INVENTION

An embodiment of the disclosure meets the needs presented above by generally comprising a housing that defines an interior space. At least one battery and a motor is coupled to the housing and are positioned in the interior space. The motor is operationally coupled to the at least one battery. Each of a pair of shafts is operationally coupled to the motor and extends through a respective opposing side of the housing. Each of a pair of pedals is selectively couplable to an associated shaft. Each pedal is configured to selectively position an associated foot and an associated hand of the user. The motor is configured to rotate the shafts to compel an associated limb of the user to rotate concurrent with the associated shaft to exercise a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
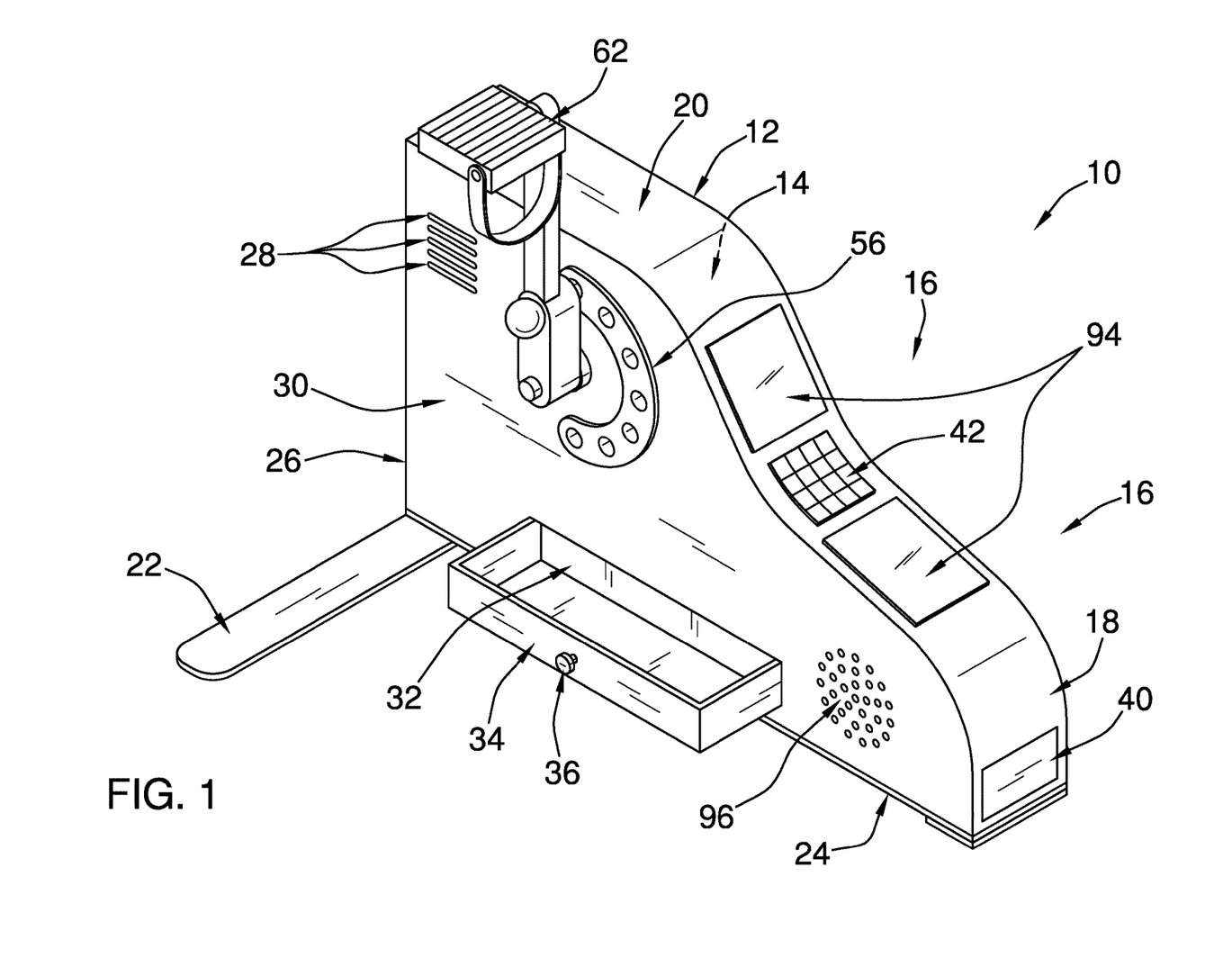
FIG. 1 is an isometric perspective view of an exercising device according to an embodiment of the disclosure.
Figure 2:
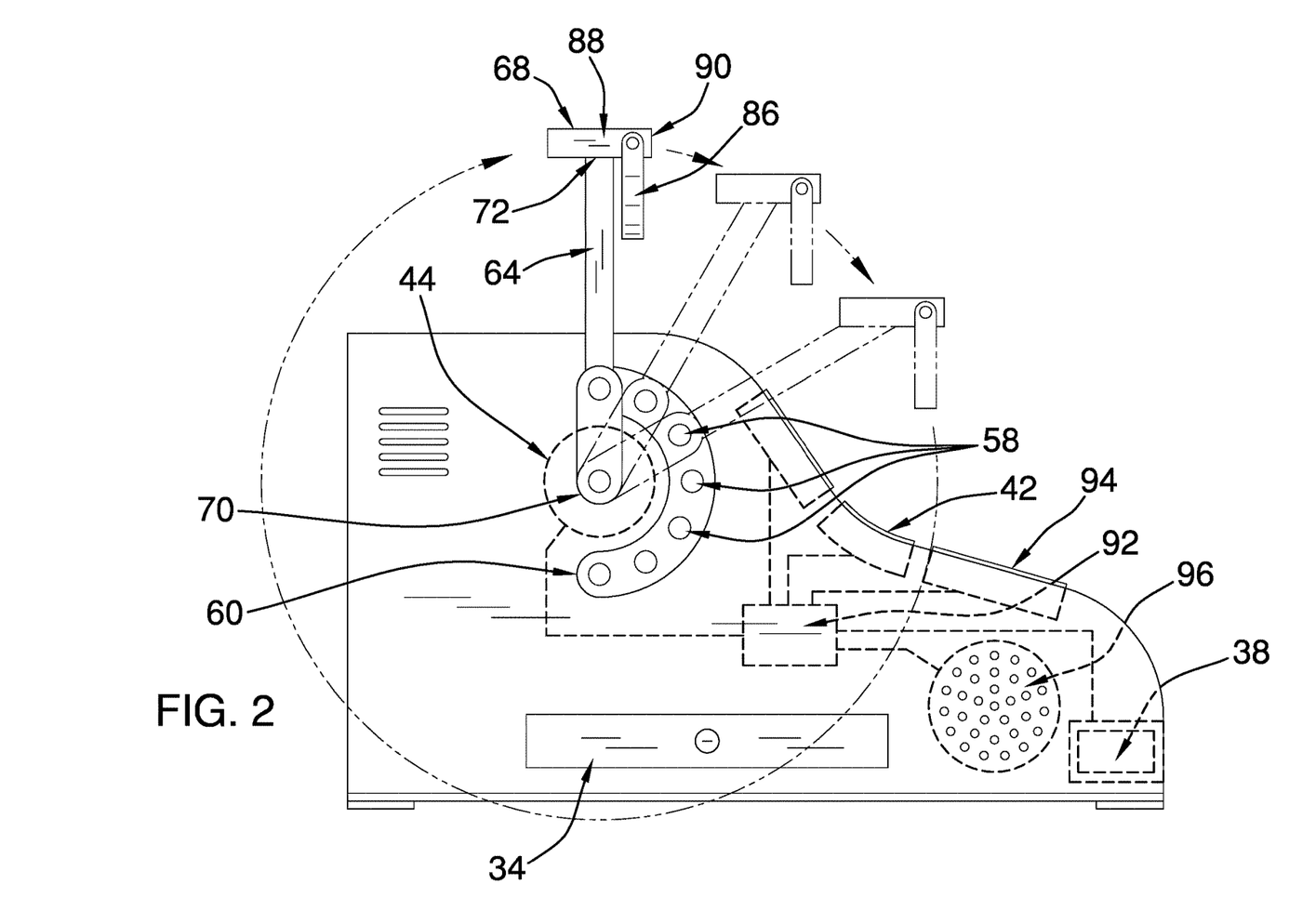
FIG. 2 is a side view of an embodiment of the disclosure.
Figure 3:
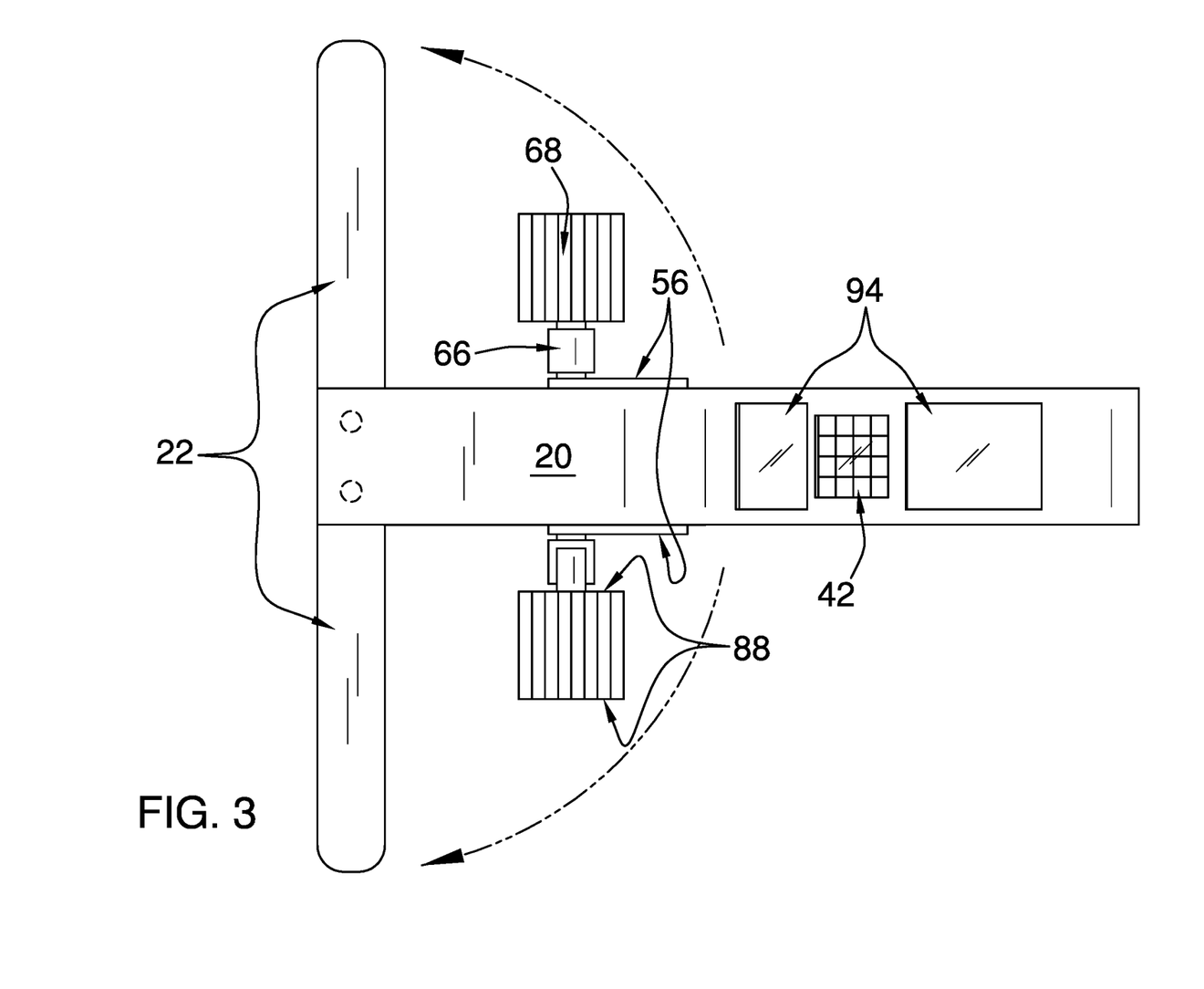
FIG. 3 is a top view of an embodiment of the disclosure.
Figure 4:
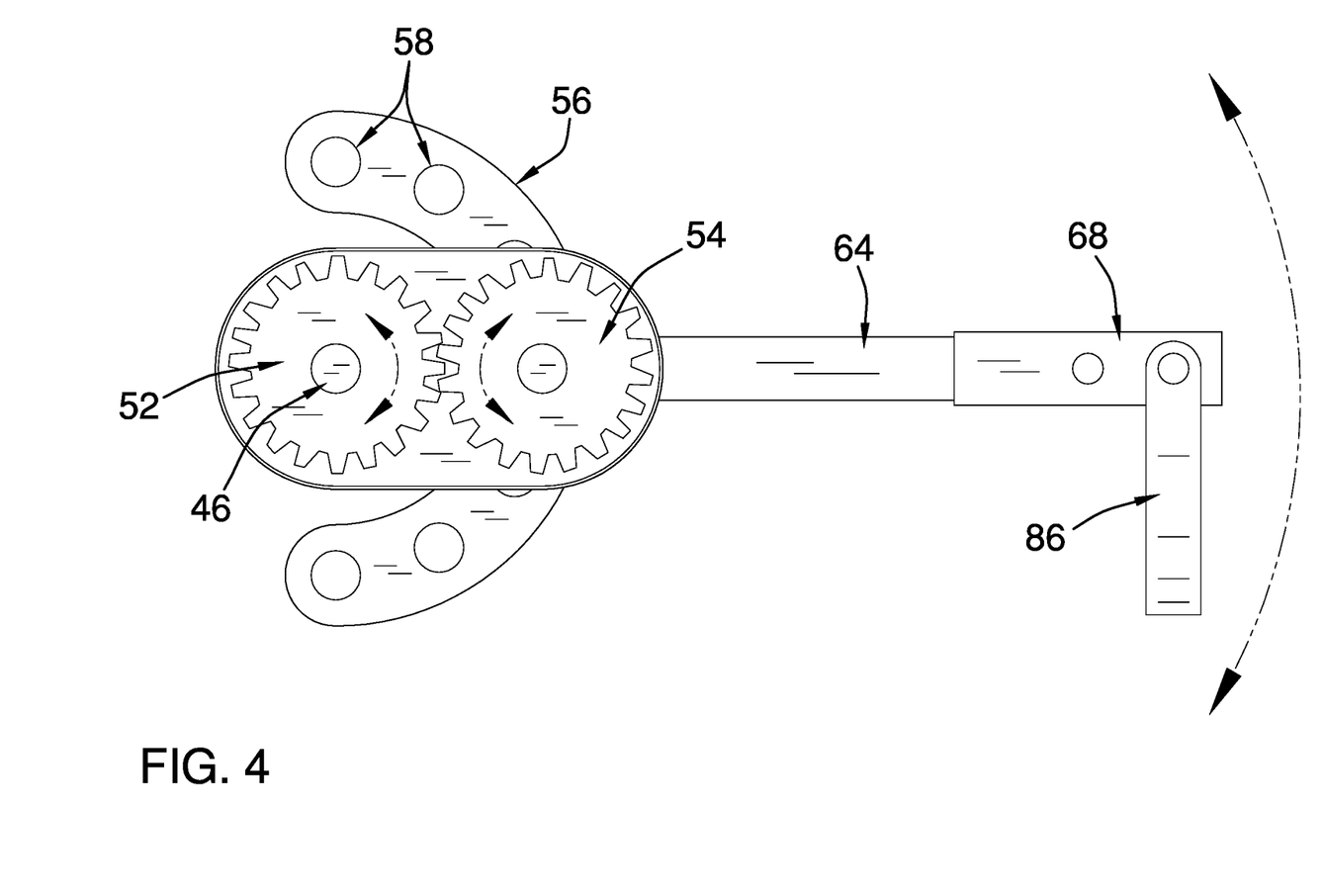
FIG. 4 is a detail view of an embodiment of the disclosure.
Figure 5:
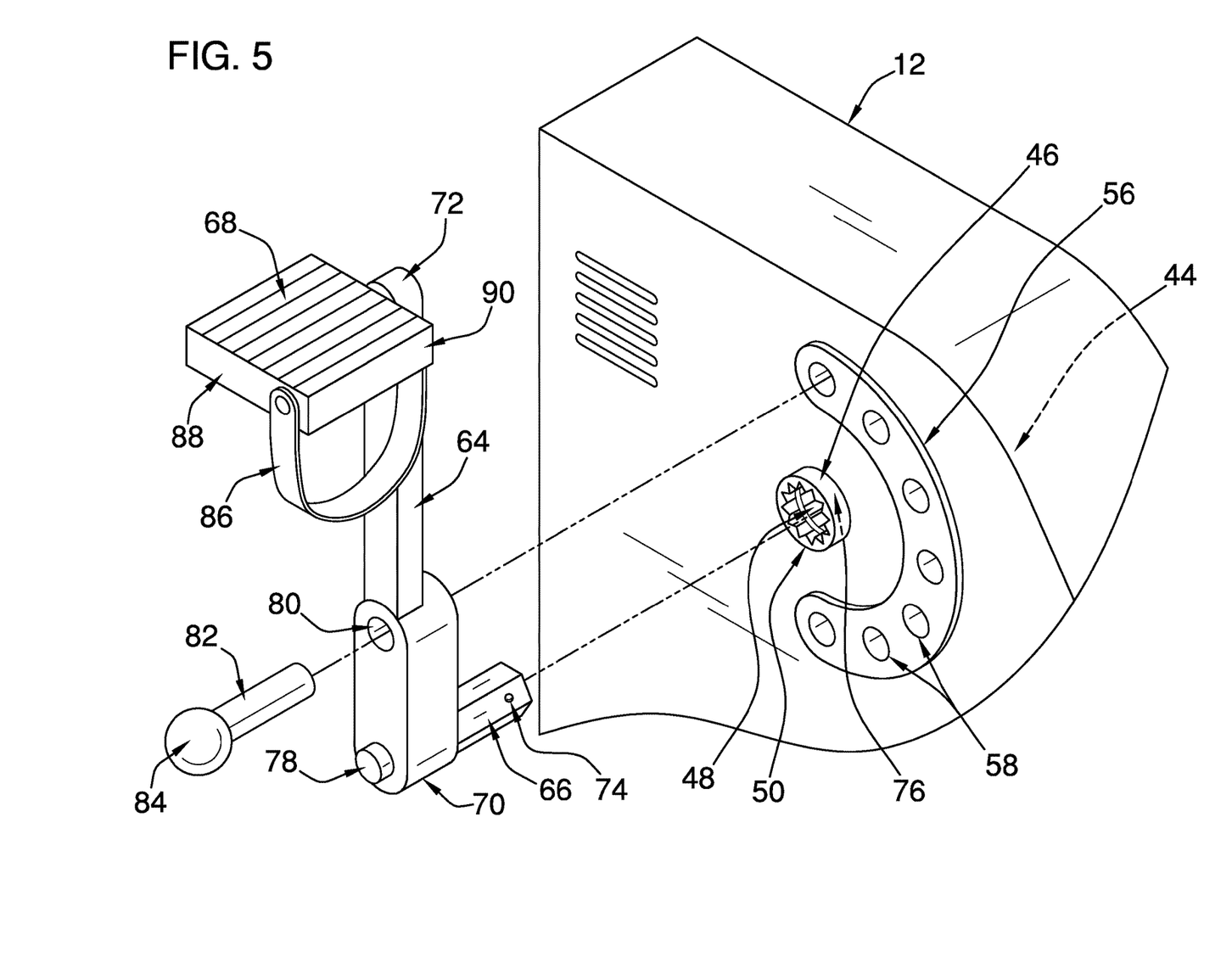
FIG. 5 is an exploded view of an embodiment of the disclosure.
Figure 6:
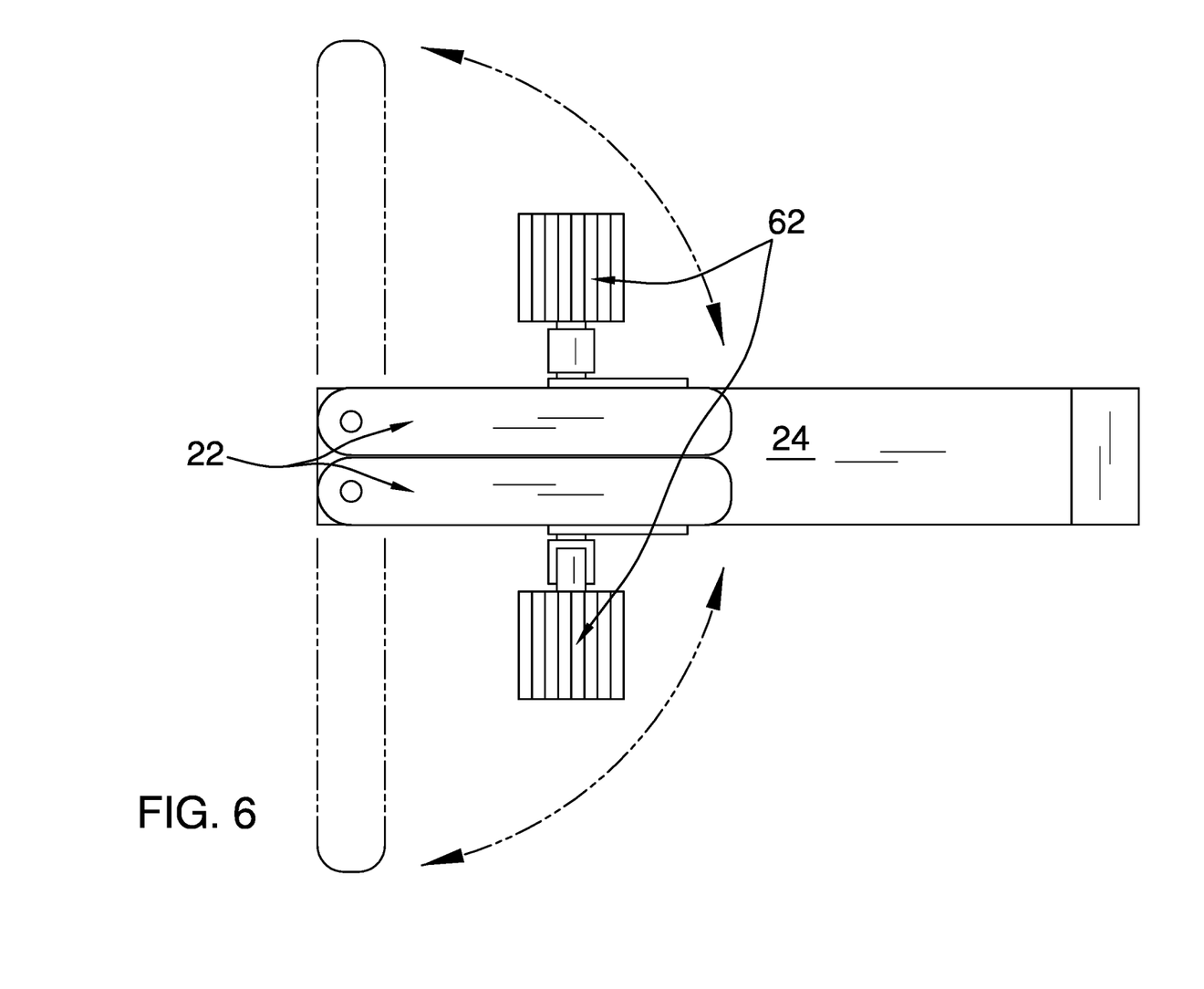
FIG. 6 is a bottom view of an embodiment of the disclosure.

With reference now to the drawings, and in particular to FIGS. 1 through 6 thereof, a new exercising device embodying the principles and concepts of an embodiment of the disclosure and generally designated by the reference numeral 10 will be described.

As best illustrated in FIGS. 1 through 6, the exercising device 10 generally comprises a housing 12 that defines an interior space 14. In one embodiment, the housing 12 is substantially rectangularly box shaped. In another embodiment, an indentation 16 extends into the housing 12 from a front 18 and a top 20 of the housing 12. The indentation 16 is S-shaped.

A pair of slats 22 is pivotally coupled to a bottom 24 of the housing 12 proximate to a back 26 of the housing 12. Each slat 22 is positioned to selectively pivot from a stowed configuration to an extended configuration. In the stowed configuration, the slat 22 extends along the bottom 24. In the extended configuration, the slat 22 extends substantially perpendicularly from the housing 12 to stabilize the housing 12 on a surface.

A plurality of first slots 28 is positioned in the housing 12. The first slots 28 are configured to vent the interior space 14. In one embodiment, the plurality of first slots 28 comprises five first slots 28 that are positioned horizontally in a respective opposing side 30 of the housing 12 proximate to the top 20 and the back 26 of the housing 12.

A second slot 32 is positioned in the respective opposing side 30 of the housing 12 proximate to the bottom 24. The second slot 32 is rectangularly shaped. A tray 34, which is complementary to the second slot 32, is positioned in the second slot 32. The tray 34 is selectively extensible from the second slot 32. The tray 34 is configured to position items to store. A handle 36 is coupled to the second tray 34. The handle 36 is configured to be grasped in digits of a hand of a user to pull to selectively extend the tray 34 from the second slot 32.

At least one battery 38 is coupled to the housing 12 and is positioned in the interior space 14. In one embodiment, the at least one battery 38 is rechargeable. A panel 40 is positioned in the front 18 of the housing 12 proximate to the at least one battery 38. The panel 40 is selectively couplable to the housing 12. The panel 40 is configured to be selectively removed to access the at least one battery 38.

At least one solar panel 42 is coupled to the top 20 of the housing 12. The at least one solar panel 42 is operationally coupled to the at least one battery 38. The solar panel 42 is configured to capture solar radiation to generate an electrical current to recharge the at least one battery 38.

A motor 44 is coupled to the housing 12 and is positioned in the interior space 14. The motor 44 is operationally coupled to the at least one battery 38. In one embodiment, the motor 44 is reversible. Each of a pair of shafts 46 is operationally coupled to the motor 44 and extends through the respective opposing side 30 of the housing 12. The motor 44 is configured to rotate the shafts 46.

Each of a pair of first channels 48 extends into an end 50 of a respective shaft 46. The first channels 48 are dodecagonally shaped when viewed from the opposing sides 30 of the housing 12.

A pair of first gears 52 and a pair of second gears 54 are positioned in the interior space 14. Each first gear 52 is coupled to a respective shaft 46. Each second gear 54 is gearedly coupled to an associated first gear 52. The motor 44 is positioned to compel the first gears 52 to rotate coincident with the shafts 46. The associated first gear 52 is positioned to compel the second gear 54 to counter rotate coincident with the respective shaft 46.

Each of a pair of first plates 56 are coupled singly to the opposing sides 30 of the housing 12. The first plates 56 are C-shaped. Each of a plurality of penetrations 58 is positioned through a respective first plate 56. In one embodiment, the plurality of penetrations 58 comprises fourteen penetrations 58 that are positioned seven apiece in each first plate 56. The penetrations 58 are substantially evenly spaced between opposing ends 60 of the first plate 56.

Each of a pair of pedals 62 is selectively couplable to an associated shaft 46. Each pedal 62 is configured to selectively position an associated foot and an associated hand of the user. The motor 44 is configured to compel an associated limb of the user to rotate concurrent with the associated the shaft 46 to exercise the user.

Each pedal 62 comprises a first bar 64, a second bar 66, and a second plate 68. The second bar 66 is coupled to and extends perpendicularly from a first end 70 of the first bar 64. The second bar 66 is hexagonally shaped when viewed longitudinally. The second bar 66 is positioned to be inserted into an associated first channel 48 to selectively couple the pedal 62 to the associated shaft 46. The second plate 68 is rotationally coupled to a second end 72 of the first bar 64. The second plate 68 is configured to selectively position the associated foot and the associated hand of the user.

In one embodiment, the first bar 64 is substantially squarely shaped when viewed longitudinally. In another embodiment, the second plate 68 is textured. The second plate 68 is configured to grip the associated foot and the associated hand to deter slippage of the associated foot and the associated hand on the second plate 68.

A first pin 74 is coupled to the second bar 66 distal from the first bar 64. The first pin 74 is spring-loaded so that the first pin 74 is biased to an extended position wherein the first pin 74 protrudes from the second bar 66. A recess 76 is positioned in the associated first channel 48. The recess 76 is complementary to the first pin 74. The recess 76 is positioned to selectively insert the first pin 74 to couple the second bar 66 to the associated shaft 46.

A button 78 is coupled to the first bar 64 proximate to the second bar 66. The button 78 is depressible. The button 78 is operationally coupled to the first pin 74. The button 78 is configured to be depressed to compel the first pin 74 to retract from the recess 76. The second bar 66 is decoupled from the associated shaft 46.

A second channel 80 is positioned through the first bar 64 between the button 78 and the second plate 68. A second pin 82 is positioned in the second channel 80. The second pin 82 is complementary to the penetrations 58. The second pin 82 is spring-loaded so that the second pin 82 is biased to an extended position wherein the second pin 82 protrudes through the first bar 64 into a respective penetration 58 to couple the first bar 64 to the first plate 56. Each penetration 58 is positioned to selectively insert the second pin 82 so that the pair of pedals 62 are selectively positionable relative to the housing 12, such as in parallel and extending toward the front 18 of the housing 12, in parallel and extending toward the back 26 of the housing 12, and opposingly positioned.

A knob 84 is coupled to the second pin 82 distal from the housing 12. The knob 84 is configured to be grasped in the digits of the hand of the user to selectively retract the second pin 82 into the second channel 80.

A strap 86 is coupled to and extends between opposing edges 88 of the second plate 68. The strap 86 is positioned proximate to a first edge 90 of the second plate 68. The strap 86 is configured to abut an ankle of the associated foot that is positioned on the second plate 68.

A microprocessor 92 is coupled to the housing 12 and is positioned in the interior space 14. The microprocessor 92 is operationally coupled to the at least one battery 38.

At least one screen 94 is coupled to the top 20 of the housing 12. The at least one screen 94 is operationally coupled to the microprocessor 92. The at least one screen 94 is touch-enabled. The at least one screen 94 is configured to selectively input commands into the microprocessor 92 to control the motor 44, such as to compel the motor 44 to rotate, to reverse, and to alternate direction of rotation. The at least one screen 94 also is configured to display at least one output, such as a speed, rotations per minute, a time, and a number of calories burned.

A speaker 96 is coupled to the housing 12. The speaker 96 is operationally coupled to the microprocessor 92. The microprocessor 92 is positioned to compel the speaker 96 to emit sound.

In use, each slat 22 is positioned to selectively pivot from the stowed configuration to the extended configuration to stabilize the housing 12 on the surface. The tray 34 is configured to position the items to store. The at least one solar panel 42 is configured to capture the solar radiation to generate the electrical current to recharge the at least one battery 38. The second bar 66 is positioned to be inserted into the associated first channel 48 to selectively couple the pedal 62 to the associated shaft 46. The second plate 68 is configured to selectively position the associated foot and the associated hand of the user. The strap 86 is configured to abut the ankle of the associated foot that is positioned on the second plate 68. The knob 84 that is positioned on the second pin 82 is configured to be grasped in the digits of the hand of the user to selectively retract the second pin 82 into the second channel 80. Each penetration 58 that is positioned in the second plate 68 is positioned to selectively insert the second pin 82. The pair of pedals 62 is selectively positionable relative to the housing 12, such as in parallel and extending toward the front 18 of the housing 12, in parallel and extending toward the back 26 of the housing 12, and opposingly positioned. The at least one screen 94 is configured to selectively input the commands into the microprocessor 92 to control the motor 44, such as to compel the motor 44 to rotate, to reverse, and to alternate direction of rotation. The associated limb of the user is compelled to rotate concurrent with the associated shaft 46 to exercise the user. The at least one screen 94 also is configured to display the at least one output, such as the speed, the rotations per minute, the time, and the number of calories burned.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An exercising device comprising:
   a housing defining an interior space;
   at least one battery coupled to said housing and positioned in said interior space;
   a motor coupled to said housing and positioned in said interior space, said motor being operationally coupled to said at least one battery, said motor being reversible;
   a pair of shafts, each said shaft being operationally coupled to said motor and extending through a respective opposing side of said housing;
   a pair of pedals, each said pedal being selectively couplable to an associated said shaft;
   wherein said shafts are positioned on said motor such that said motor is configured for rotating said shafts, wherein said pedals are positioned on said shafts such that each said pedal is configured for selectively positioning an associated foot and an associated hand of the user such that said motor is configured for compelling an associated limb of the user for rotating concurrent with said associated said shaft for exercising a user;
   a pair of first gears positioned in said interior space, each said first gear being coupled to a respective said shaft;
   a pair of second gears positioned in said interior space, each said second gear being gearedly coupled to an associated said first gear; and
   wherein said first gears are positioned on said shafts such that said motor is positioned for compelling said first gears for rotating coincident with said shafts, wherein said second gear is positioned on said associated said first gear such that said associated said first gear is positioned for compelling said second gear for counter rotating coincident with said respective said shaft.

2. The device of claim 1, further comprising:
   said housing being substantially rectangularly box shaped; and
   an indentation extending into said housing from a front and a top of said housing, said indentation being S-shaped.

3. The device of claim 1, further including a pair of slats pivotally coupled to a bottom of said housing proximate to a back of said housing, wherein said slats are positioned on said housing such that each said slat is positioned for selectively pivoting from a stowed configuration wherein said slat extends along said bottom and an extended configuration wherein said slat extends substantially perpendicularly from said housing for stabilizing said housing on surface.

4. The device of claim 1, further including a plurality of first slots positioned in said housing, wherein said first slots are positioned in said housing such that said first slots are configured for venting said interior space.

5. The device of claim 4, further including said plurality of first slots comprising five said first slots positioned horizontally in said respective said opposing side of said housing proximate to a top and a back of said housing.

6. The device of claim 1, further comprising:
   a second slot positioned in said respective said opposing side of said housing proximate to a bottom of said housing, said second slot being rectangularly shaped;
   a tray complementary to and positioned in said second slot, said tray being selectively extensible from said second slot; and
   wherein said tray is positioned in said second slot such that said tray is configured for positioning items for storing.

7. The device of claim 6, further including a handle coupled to said tray, wherein said handle is positioned on said tray such that said handle is configured for grasping in digits of a hand of a user for pulling for selectively extending said tray from said second slot.

8. The device of claim 1, further including said at least one battery being rechargeable.

9. The device of claim 1, further including a panel positioned in said front of said housing proximate to said at least one battery, said panel being selectively couplable to said housing, wherein said panel is positioned in said housing such that said panel is configured for selectively removing for accessing said at least one battery.

10. The device of claim 1, further including at least one solar panel coupled to said top of said housing, said at least one solar panel being operationally coupled to said at least one battery, wherein said at least one solar panel is positioned on said housing such that said solar panel is configured for capturing solar radiation for generating an electrical current for recharging said at least one battery.

11. The device of claim 1, further comprising:
   a pair of first channels, each said first channel extending into an end of a respective said shaft, said first channels being dodecagonally shaped when viewed from said opposing sides of said housing;
   each said pedal comprising:
      a first bar,
      a second bar coupled to and extending perpendicularly from a first end of said first bar, said second bar being hexagonally shaped when viewed longitudinally, and
      a second plate rotationally coupled to a second end of said first bar; and
   wherein said second bar is positioned on said first bar such that said second bar is positioned for inserting into an associated said first channel for selectively coupling said pedal to said associated said shaft, wherein said second plate is positioned on said second bar such that said second plate is configured for selectively positioning the associated foot and the associated hand of the user.

12. The device of claim 11, further including said first bar being substantially squarely shaped when viewed longitudinally.

13. The device of claim 11, further including said second plate being textured such that said second plate is configured for gripping the associated foot and the associated hand for deterring slipping of the associated foot and the associated hand on said second plate.

14. The device of claim 11, further comprising:
a first pin coupled to said second bar distal from said first bar, said first pin being spring-loaded such that said first pin is biased to an extended position wherein said first pin protrudes from said second bar;
a recess positioned in said associated said first channel, said recess being complementary to said first pin;
a button coupled to said first bar proximate to said second bar, said button being depressible, said button being operationally coupled to said first pin; and
wherein said recess is positioned in said associated said first channel such that said recess is positioned for selectively inserting said first pin for coupling said second bar to said associated said shaft, wherein said button is positioned on said first bar such that said button is configured for depressing for compelling said first pin for retracting from said recess such that said second bar is decoupled from said associated said shaft.

15. The device of claim 11, further including a strap coupled to and extending between opposing edges of said second plate, said strap being positioned proximate to a first edge of said second plate, wherein said strap is positioned on said second plate such that said strap is configured for abutting an ankle of the associated foot positioned on said second plate.

16. An exercising device comprising:
a housing defining an interior space, said housing being substantially rectangularly box shaped;
an indentation extending into said housing from a front and a top of said housing, said indentation being S-shaped;
a pair of slats pivotally coupled to a bottom of said housing proximate to a back of said housing, wherein said slats are positioned on said housing such that each said slat is positioned for selectively pivoting from a stowed configuration wherein said slat extends along said bottom and an extended configuration wherein said slat extends substantially perpendicularly from said housing for stabilizing said housing on surface;
a plurality of first slots positioned in said housing, wherein said first slots are positioned in said housing such that said first slots are configured for venting said interior space, said plurality of first slots comprising five said first slots positioned horizontally in a respective opposing side of said housing proximate to said top and said back of said housing;
a second slot positioned in said respective said opposing side of said housing proximate to said bottom, said second slot being rectangularly shaped;
a tray complementary to and positioned in said second slot, said tray being selectively extensible from said second slot, wherein said tray is positioned in said second slot such that said tray is configured for positioning items for storing;
a handle coupled to said tray, wherein said handle is positioned on said tray such that said handle is configured for grasping in digits of a hand of a user for pulling for selectively extending said tray from said second slot;
at least one battery coupled to said housing and positioned in said interior space, said at least one battery being rechargeable;
a panel positioned in said front of said housing proximate to said at least one battery, said panel being selectively couplable to said housing, wherein said panel is positioned in said housing such that said panel is configured for selectively removing for accessing said at least one battery;
at least one solar panel coupled to said top of said housing, said at least one solar panel being operationally coupled to said at least one battery, wherein said at least one solar panel is positioned on said housing such that said solar panel is configured for capturing solar radiation for generating an electrical current for recharging said at least one battery;
a motor coupled to said housing and positioned in said interior space, said motor being operationally coupled to said at least one battery, said motor being reversible;
a pair of shafts, each said shaft being operationally coupled to said motor and extending through said respective said opposing side of said housing, wherein said shafts are positioned on said motor such that said motor is configured for rotating said shafts;
a pair of first channels, each said first channel extending into an end of a respective said shaft, said first channels being dodecagonally shaped when viewed from said opposing sides of said housing;
a pair of first gears positioned in said interior space, each said first gear being coupled to a respective said shaft, wherein said first gears are positioned on said shafts such that said motor is positioned for compelling said first gears for rotating coincident with said shafts;
a pair of second gears positioned in said interior space, each said second gear being gearedly coupled to an associated said first gear, wherein said second gear is positioned on said associated said first gear such that said associated said first gear is positioned for compelling said second gear for counter rotating coincident with said respective said shaft;
a pair of pedals, each said pedal being selectively couplable to an associated said shaft, wherein said pedals are positioned on said shafts such that each said pedal is configured for selectively positioning an associated foot and an associated hand of the user such that said motor is configured for compelling an associated limb of the user for rotating concurrent with said associated said shaft for exercising the user, each said pedal comprising:
a first bar, said first bar being substantially squarely shaped when viewed longitudinally,
a second bar coupled to and extending perpendicularly from a first end of said first bar, said second bar being hexagonally shaped when viewed longitudinally, wherein said second bar is positioned on said first bar such that said second bar is positioned for inserting into an associated said first channel for selectively coupling said pedal to said associated said shaft,
a second plate rotationally coupled to a second end of said first bar, wherein said second plate is positioned on said second bar such that said second plate is configured for selectively positioning the associated foot and the associated hand of the user, said second plate being textured such that said second plate is configured for gripping the associated foot and the associated hand for deterring slipping of the associated foot and the associated hand on said second plate, a first pin coupled to said second bar distal from said first bar, said first pin being spring-loaded such that said first pin is biased to an extended position wherein said first pin protrudes from said second bar, a recess positioned in said associated said first channel, said recess being complementary to said first pin, wherein said recess is positioned in said associated said first channel such that said recess is positioned for selectively inserting said first pin for coupling said second bar to said associated said shaft, a button coupled to said first bar proximate to said second bar, said button being depressible, said button being operationally coupled to said first pin, wherein said button is positioned on said first bar such that said button is configured for depressing for compelling said first pin for retracting from said recess such that said second bar is decoupled from said associated said shaft, and a strap coupled to and extending between opposing edges of said second plate, said strap being positioned proximate to a first edge of said second plate, wherein said strap is positioned on said second plate such that said strap is configured for abutting an ankle of the associated foot positioned on said second plate.

\* \* \* \* \*